US010266006B2

(12) United States Patent
Weis et al.

(10) Patent No.: US 10,266,006 B2
(45) Date of Patent: Apr. 23, 2019

(54) MOBILE COMPONENT HAVING A ROLLER BEARING UNIT

(71) Applicant: SEW-EURODRIVE GMBH & CO. KG, Bruchsal (DE)

(72) Inventors: Patrick Weis, Ubstadt-Weiher (DE); Friedrich Manz, Kraichtal-Münzesheim (DE); Frank Schönung, Graben-Neudorf (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 14/787,220

(22) PCT Filed: Mar. 31, 2014

(86) PCT No.: PCT/EP2014/000855
§ 371 (c)(1),
(2) Date: Oct. 26, 2015

(87) PCT Pub. No.: WO2014/173490
PCT Pub. Date: Oct. 30, 2014

(65) Prior Publication Data
US 2016/0089932 A1 Mar. 31, 2016

(30) Foreign Application Priority Data

Apr. 25, 2013 (DE) .................. 10 2013 007 112

(51) Int. Cl.
B60B 33/00 (2006.01)
B60B 33/02 (2006.01)
F16D 63/00 (2006.01)

(52) U.S. Cl.
CPC ...... B60B 33/0086 (2013.01); B60B 33/0042 (2013.01); B60B 33/0068 (2013.01);
(Continued)

(58) Field of Classification Search
CPC .............. B60B 33/026; B60B 33/0086; B60B 33/0092
See application file for complete search history.

(56) References Cited

U.S. PATENT DOCUMENTS 2,687,546 A * 8/1954 Oppenheimer ......... B60B 19/14
16/26
3,031,037 A * 4/1962 Stollman ............... B60B 33/021
188/111
(Continued)

FOREIGN PATENT DOCUMENTS

CN 2723510 Y 9/2005
DE 9310568 U1 9/1993
(Continued)

OTHER PUBLICATIONS

International Search Report issued in PCT/EP2014/000855, dated Jun. 25, 2014.
(Continued)

Primary Examiner — Thomas J Williams
Assistant Examiner — James K Hsiao
(74) Attorney, Agent, or Firm — Hunton Andrews Kurth LLP

(57) ABSTRACT

A mobile component having a roller bearing unit, in particular a mobile component having a steering roller, a roller, in particular a drive roller, being rotationally braced in a pivot unit, which is supported via a pivot bearing on the frame of the mobile component, the axes of rotation of the two pivot bearings in particular being aligned perpendicularly with respect to each other, the axis of rotation of the pivot bearing for pivoting parallel to the direction of the normal of the normal of the driving surface of the mobile component touched by the roller, a drum brake being developed on the roller, the actuation of the drum brake being able to be brought about by an electromagnet, which is connected
(Continued)

on the frame of the mobile component, the drum brake being able to be actuated by the electromagnet via a wedge gear.

18 Claims, 5 Drawing Sheets

(52) U.S. Cl.
CPC ...... *B60B 33/0078* (2013.01); *B60B 33/0092* (2013.01); *B60B 33/021* (2013.01); *B60B 33/026* (2013.01)

(56) References Cited

U.S. PATENT DOCUMENTS

| | | | | |
|---|---|---|---|---|
| 3,031,038 A * | 4/1962 | Chait | ............... | B60B 33/0094 188/111 |
| 3,590,962 A * | 7/1971 | Parker | ............... | B62B 5/0423 188/111 |
| 3,809,191 A * | 5/1974 | Woodward | ........... | B60T 13/741 188/106 A |
| 4,998,320 A * | 3/1991 | Lange | ................ | B60B 33/021 16/35 R |
| 5,064,012 A * | 11/1991 | Losego | ............. | B62B 5/0026 180/19.1 |
| 5,133,106 A * | 7/1992 | Milbredt | ........... | B60B 33/021 16/35 R |
| 5,303,450 A * | 4/1994 | Lange | ................ | B60B 33/021 16/35 D |
| 5,432,412 A * | 7/1995 | Harris | ................ | B60R 25/09 188/69 |
| 5,774,936 A * | 7/1998 | Vetter | ................ | B60B 33/021 16/35 R |
| 5,799,366 A * | 9/1998 | Zocco | ................ | B60B 33/021 16/35 R |
| 5,806,862 A * | 9/1998 | Merryman | ........... | B62B 5/0423 188/111 |
| 5,823,302 A * | 10/1998 | Schweninger | ............ | B60T 7/18 188/111 |
| 6,161,849 A * | 12/2000 | Schweninger | ........ | B60B 33/021 16/18 R |
| 6,362,728 B1 * | 3/2002 | Lace | ................ | B60R 25/08 188/111 |
| 6,662,404 B1 * | 12/2003 | Stroh | ................ | B60B 33/0002 16/35 R |
| 6,839,938 B2 * | 1/2005 | Kausemann | ........ | B60B 33/0039 16/18 R |
| 6,865,775 B2 * | 3/2005 | Ganance | ................ | A61G 7/00 16/35 R |
| 7,406,745 B2 * | 8/2008 | Chou | ................ | B60B 33/0021 16/35 R |
| 7,712,184 B1 * | 5/2010 | Lewis | ................ | B60B 33/0039 16/18 R |
| 8,292,327 B2 * | 10/2012 | Araya Moreno | ... | B60B 33/0005 16/35 R |
| 8,499,413 B1 * | 8/2013 | Tsai | ................ | B60B 33/02 16/35 R |
| 8,850,657 B1 * | 10/2014 | Yang | ................ | B60B 33/0042 16/18 R |
| 9,139,043 B1 * | 9/2015 | Fan | ................ | B60B 33/0028 |
| 9,409,444 B2 * | 8/2016 | Dayt | ................ | B60B 33/0021 |
| 9,457,833 B2 * | 10/2016 | Dimig | ................ | B60R 25/0215 |
| 2004/0064915 A1 * | 4/2004 | Silverstein | ........ | B60B 33/0005 16/35 R |
| 2005/0155824 A1 * | 7/2005 | Taba | ................ | B60R 25/09 188/19 |
| 2007/0056141 A1 * | 3/2007 | Armano | ............ | B60B 33/0021 16/35 R |
| 2007/0174965 A1 * | 8/2007 | Lemire | ................ | A61G 7/005 5/600 |
| 2008/0066979 A1 * | 3/2008 | Carter | ................ | B60L 11/1861 180/65.51 |
| 2011/0119864 A1 * | 5/2011 | Minowa | ............ | B60B 33/0005 16/45 |
| 2011/0247903 A1 * | 10/2011 | Boukhny | ............ | B60B 33/0042 188/68 |
| 2012/0311821 A1 * | 12/2012 | Eguchi | ................ | A45C 5/145 16/35 R |
| 2013/0174375 A1 * | 7/2013 | Lin | ................ | B60B 33/0086 16/47 |
| 2014/0216862 A1 * | 8/2014 | Chen | ................ | B62B 5/0447 188/31 |

FOREIGN PATENT DOCUMENTS

| | | |
|---|---|---|
| DE | 10006009 A1 | 8/2001 |
| DE | 10312409 A1 | 9/2004 |
| EP | 0434916 A1 | 7/1991 |
| EP | 2301764 A1 | 3/2011 |
| GB | 1342034 A | 12/1973 |

OTHER PUBLICATIONS

International Preliminary Report on Patentability issued in PCT/EP2014/000855, dated Oct. 27, 2015.

* cited by examiner

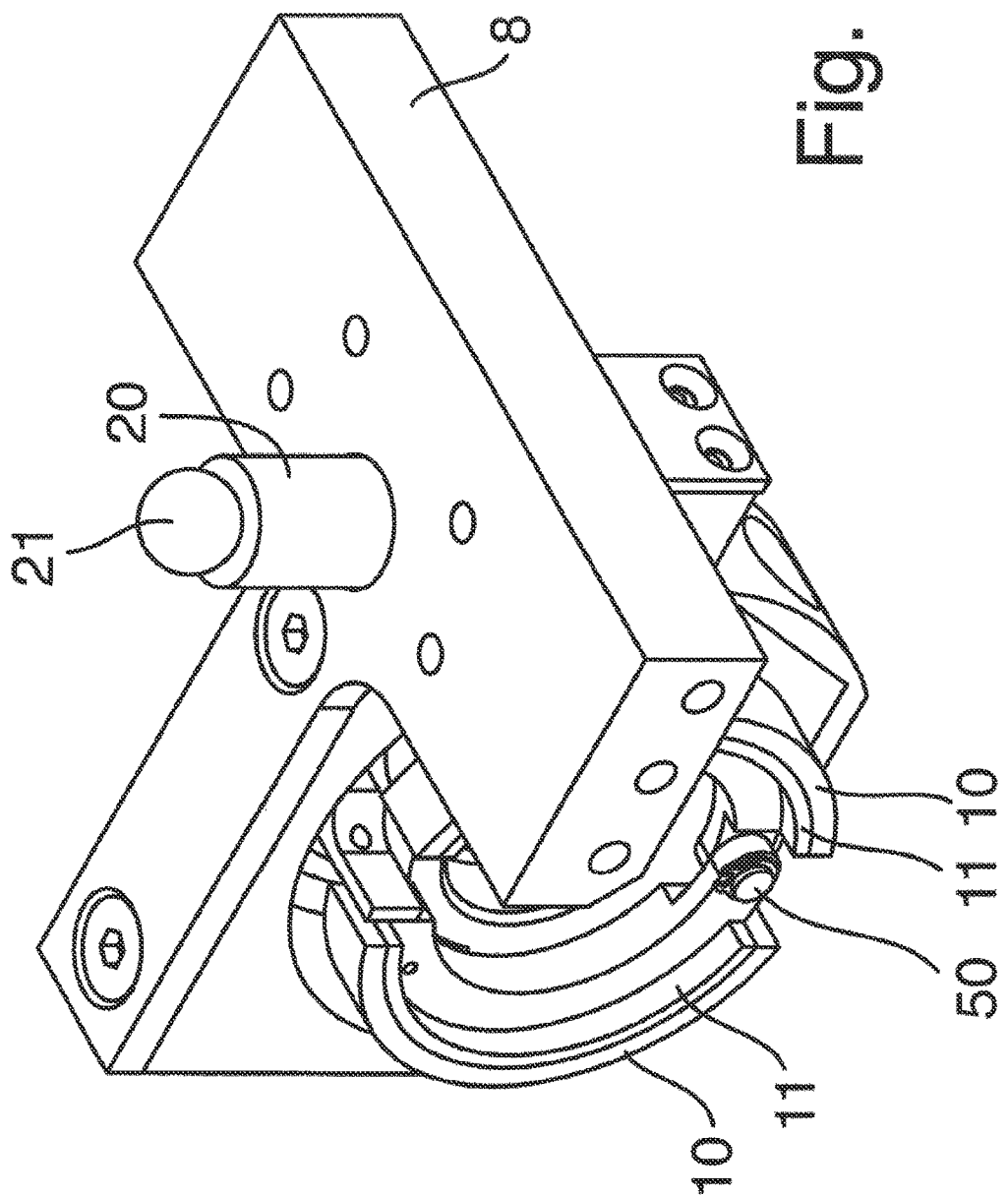

MOBILE COMPONENT HAVING A ROLLER BEARING UNIT

FIELD OF THE INVENTION

The present invention relates to a mobile component having a roller bearing unit.

BACKGROUND INFORMATION

It is generally known that mobile components such as shopping carts in supermarkets come equipped with steering rollers, where rollers are provided on a pivot unit and align themselves as a function of the driving direction.

SUMMARY

Therefore, the present invention is based on the objective of further developing a mobile component, for which an electromagnetically actuable drum brake is provided.

Features of the invention in the mobile component include that the mobile component is provided with a roller bearing unit, which in particular includes a steering roller, a roller, especially a drive roller, i.e., a roller of the steering roller, is rotationally braced in a pivot unit, which is supported on the frame of the mobile component via a pivot bearing, in particular the axes of rotation of the two pivot bearings being orthogonally aligned with respect to each other, the axis of rotation of the pivot bearing in particular for pivoting parallel to the direction of the normal of the driving surface of the mobile component touched by the roller, a drum brake is developed on the roller, the actuation of the drum brake is able to be induced by an electromagnet, which is connected on the frame of the mobile component, the drum brake is able to be actuated by the electromagnet via a wedge gear.

This has the advantage that the actuation is able to take place through the pivot bearing of the pivot unit. In other words, the electromagnet is fixed in place on the frame of the mobile component and does not have to be integrated in the pivot unit, which results in a robust construction. The wedge gear, developed in the form of a bevel gear, may be used for deflecting the displacement direction of an armature part of the electromagnet induced by the electromagnet in the transverse direction. A means for deflecting the actuating force that has an especially simple design is therefore possible.

In one advantageous development, a coupling, in particular a coupling that includes a ball, is situated between the electromagnet and the wedge gear. This has the advantage that misalignments between the armature part of the electromagnet and the locking part used as further coupling component, i.e., the input part of the wedge gear, are possible.

In one advantageous development, the electromagnet has an armature part which is disposed so as to allow movement and which can be pressed against a locking part of the wedge gear by a spring element, in particular when the coil of the electromagnetic is not energized, so that a further locking part of the wedge gear is displaced, in particular in a direction that has a non-vanishing angle with respect to the displacement direction of the armature part, especially an angle that runs perpendicular to the displacement direction of the armature part. This is advantageous insofar as the further locking part is displaceable in the transverse direction, and a second, further locking part is displaceable counter to the transverse direction. This enables the operation of a drum brake.

In one advantageous development, one of the locking parts has a sloping surface area in order to form the wedge gear, and a roller, which is able to roll along the sloping surface, is braced on the other locking part, the direction of the surface normal of the sloping surface area in particular having a non-vanishing angle with respect to the displacement direction of the armature part. This is advantageous insofar as the wedge gear has an especially simple design.

In one advantageous development, a ball is interposed as a coupling between the armature part and the locking part, the ball in particular projecting into, or being situated within, a depression of the armature part and a depression of the locking part. This has the advantage that a simple coupling is obtainable with the aid of the ball, and the ball is always supported because the spring element of the electromagnet and the spring element disposed between the brake pad supports of the drum brake is always exerting pressure on the ball, that is to say, in particular do not release it.

In one advantageous development, the coil is situated in a coil core housing part which is connected to a coil core which is at least partially surrounded by the coil, and in particular a working air gap is disposed between the armature part and the coil core, which is situated in the region covered by the coil in the longitudinal direction. That is advantageous insofar as the housing may be produced from ferromagnetic material and the magnetic field lines are therefore able to be guided directly around the coil of the electromagnet.

In one advantageous development, the wedge gear as the input locking part includes the locking part that is drivable by the armature part, and it has two output locking parts, each featuring a sloping surface, each output locking part being connected to a brake pad support, which is able to be pressed against a brake drum of the roller by the locking part. This has the advantage that the angular deflection enables a simple operation of the brake.

In one advantageous development, the two brake pad supports are interconnected with the aid of a pivot bearing and are moved toward each other with the aid of a spring element, in particular in the circumferential direction, the pivot bearing in particular being set apart from the spring element in the circumferential direction, especially at a maximum distance. This offers the advantage that a drum brake including a restoring spring is able to be realized, which has a simple design.

In one advantageous development, the roller includes a roller lining that radially surrounds the brake drum, the roller lining in particular being produced from vulcanized material, especially rubber. This is advantageous insofar as low driving noise is generated.

In one advantageous development, the force that operates the drum brake is radially conducted within the pivot bearing, which advantageously results in a compact design.

In one advantageous development, the pivot bearing is realized by an inner ring, which is slidingly supported inside an outer ring, their ring axes being identical, in particular, the inner ring being form-fittingly disposed inside the outer ring in the axial direction, or the outer ring inside the inner ring, the inner ring in particular being provided in a groove of the outer ring, or the outer ring being provided in a groove of the inner ring, the part having the groove, i.e., the inner ring or the outer ring, being made up of multiple parts, in particular, the outer ring in particular being fixed in place on the frame of the mobile part, and the inner ring being fixed in place on the pivoting part. This has the advantage that the pivot bearing is developed in such a way that the actuating force is able to be conducted through the radial inner region.

In one advantageous development, the armature part and the locking part are spaced apart from each other in the longitudinal direction of the coil of the electromagnet, the ball of the coupling being interposed, in particular. This advantageously makes it possible to realize a simple coupling.

In one advantageous development, the pivot unit is lockable on the frame in a reversible manner with the aid of a locking unit.

the locking unit in particular including an electromagnet, whose linearly displaceable armature part is able to be driven into a depression, especially a bore hole, for locking, and in particular when the electromagnet is energized, the armature part is able to be driven out, counter to the force of a spring element, especially for unlocking purposes. This has the advantage that the steering roller unit is fixedly alignable in the driving direction.

Further advantages are derived from the dependent claims. The present invention is not restricted to the feature combination of the claims. Those skilled in the art will discover additional meaningful possibilities for combining claims and/or individual claim features and/or features of the specification and/or of the figures, that arise from the stated objective and/or the objective resulting from a comparison with the related art, in particular.

BRIEF DESCRIPTION OF THE DRAWINGS

FIG. 5 shows brake pad supports 11, which are displaceable by the control element.

DETAILED DESCRIPTION

Figure 1:
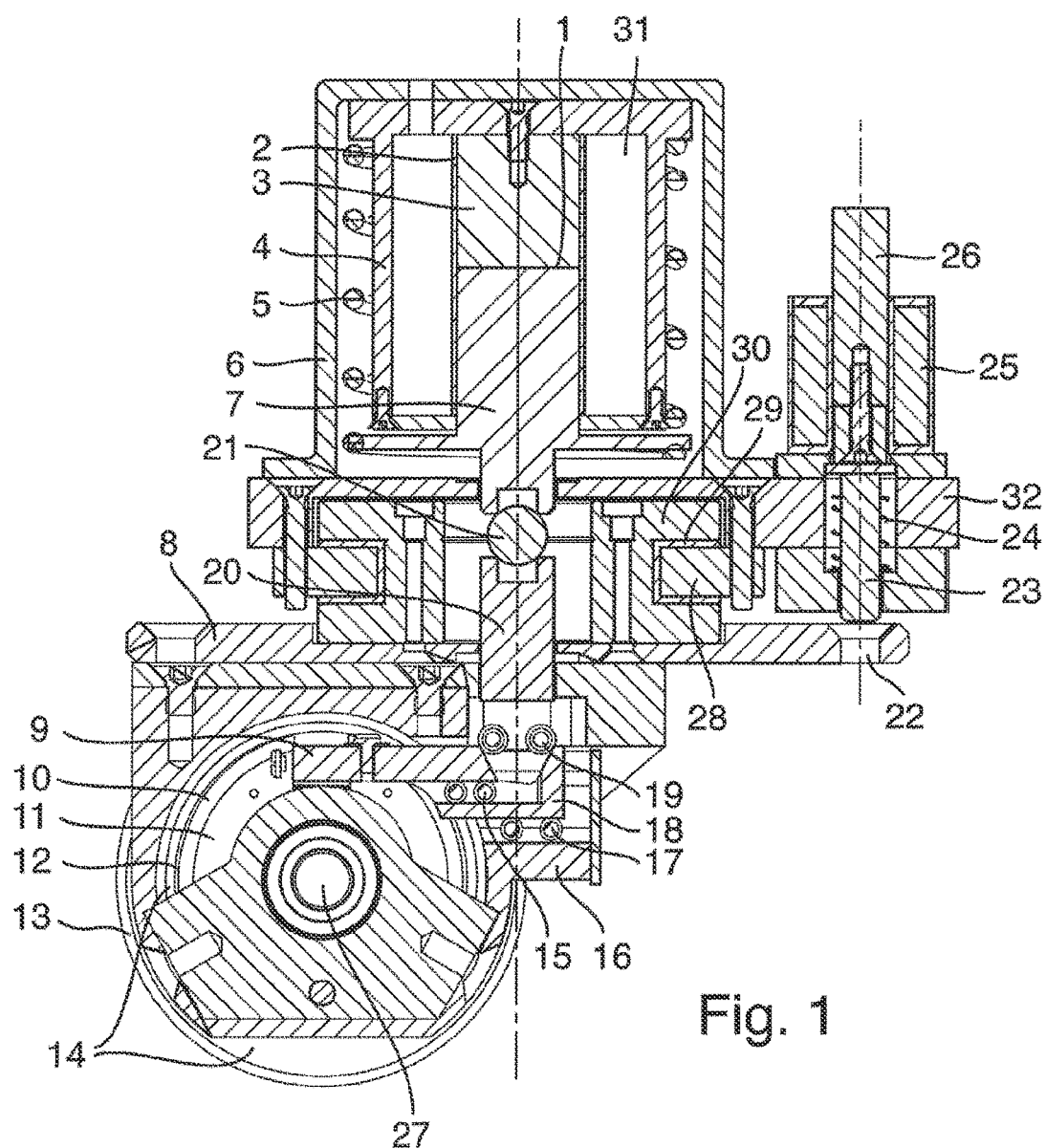
FIG. 1 shows a cross section through a roller bearing unit of a mobile component having a drum brake according to the present invention.
Figure 2:
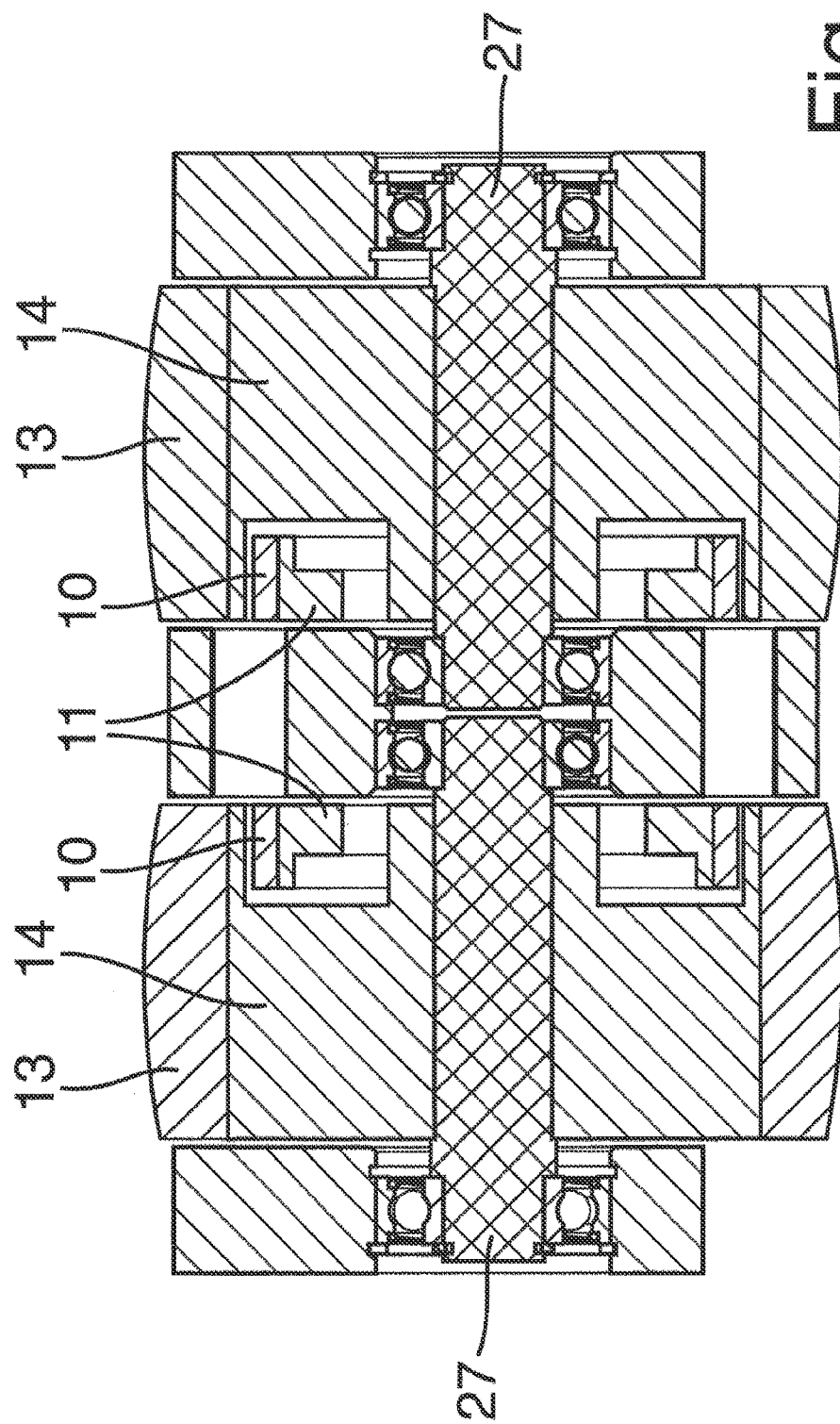
FIG. 2 shows a longitudinal section through the rollers of the roller bearing unit.
Figure 3:
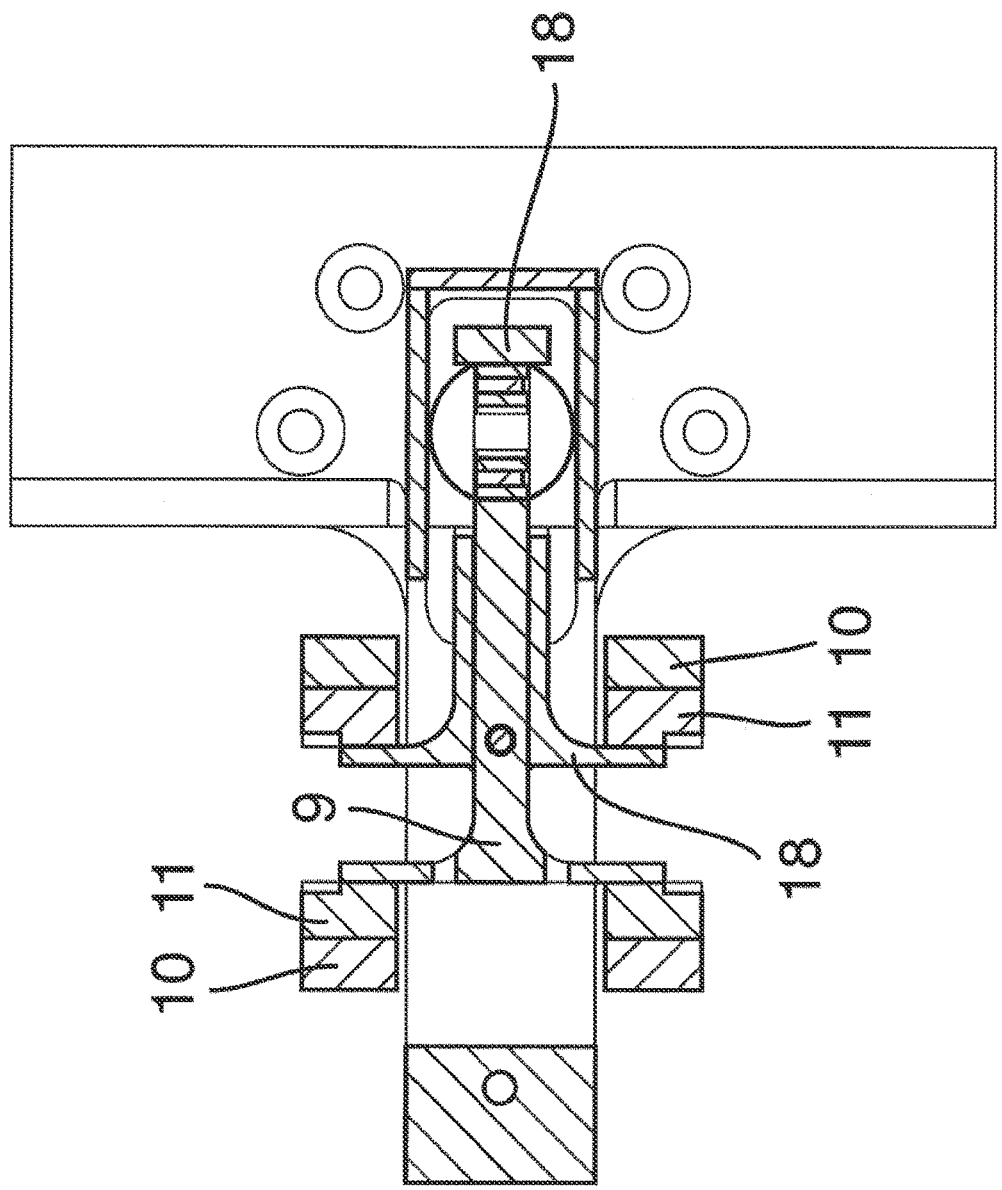
FIG. 3 shows a control element of the drum brake.
Figure 4:
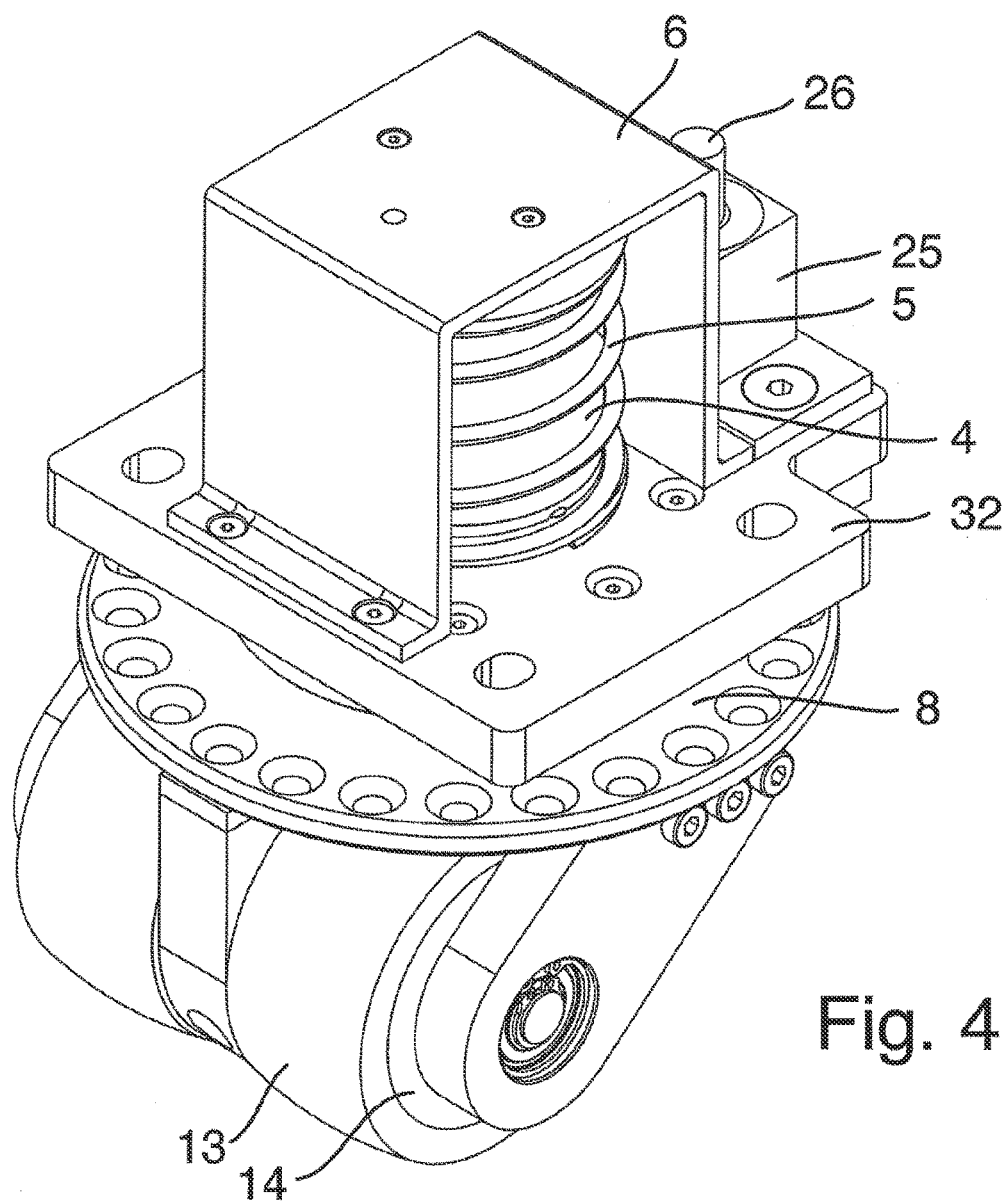
FIG. 4 shows an oblique view of the roller bearing unit.

The mobile component according to the present invention is preferably implemented as a driverless transport system and/or as an automatically steered vehicle. The present invention consequently also relates to mobile transport systems.

The mobile component has roller bearing units, which are mounted on the frame of the mobile component and in essence shunt the weight force to the floor. In addition, the mobile component has a drive wheel, which is pressed against the driving surface by a spring element and is drivable by an electric motor.

Each roller bearing unit has rollers, which are supported via a roller bearing unit, the roller bearing unit itself being rotationally supported on the frame of the mobile component.

The rollers are able to be braked with the aid of an electromagnetically actuable brake device, the brake device having a design that resembles a drum brake.

When energized, a coil 31 generates a magnetic field, which reduces air gap 1 between a coil core 3 connected to a housing part 6 and an armature part 7.

Coil 31 is provided around a sleeve-type coil brace, which is made of aluminum or plastic and functions as a sliding bearing for an armature part 7, which is fixed so as to allow it to move in the longitudinal direction of coil 31.

When coil 31 is energized, armature part 7 is attracted in the direction of coil core 3, counter to the spring force of a spring element which pushes armature part 7 away from coil core housing part 4. Coil core housing part 4 surrounds coil 31 and routes the magnetic field conducted inside coil core 3 along the outside of coil 31. Armature part 7 projects into the coil interior, so that an air gap 1 between armature part 7 and coil core 3 is greater when coil 31 is not energized than when coil 31 is energized.

Armature part 7 and coil core 3 are made of ferromagnetic material, such as steel or ferrite.

At its first end, spring element 5 is braced on coil core housing part 4, and at its second end, it is supported on armature part 7. Spring element 5 thus pushes armature part 7 out of the space region surrounded by coil 31 and the coil brace. When energized, on the other hand, armature part 7 is pulled into this space region.

Housing part 6 surrounds coil core housing part 4 including spring element 5.

Housing part 6 is connected to support plate 32. Outer ring part 28 is connected to support plate 32.

Sliding bearing element 29 is situated between outer ring part 28 and inner ring part 30. Outer ring part 28 and inner ring part 30 thus are braced against each other in a rotatable manner, the axis of rotation being identical to the axis of symmetry, i.e., the longitudinal axis, of coil 31 and armature part 7.

The disk with a bore pattern of bores 22 is connected to inner ring part 30, especially by screws. Bores 22 are situated at the same radial distance from the axis of rotation and are spaced apart from each other in the circumferential direction, especially at regular intervals.

A locking unit, which includes a coil 25, is also situated on support part 32; when coil 25 is energized, a locking latch 23 is pulled into coil 25 in the direction of coil core 26, once again counter to the spring force of a spring element 24, and the locking latch is thereby pulled out of bore 22 and disk 8 released as a result. When no current is supplied, on the other hand, spring element 24 presses locking latch 23 into the bore and thereby fixates the rotary position of disk 8, i.e., the angular position of disk 8 relative to support part 32. This makes it possible to specify the driving direction of the mobile component.

Armature part 7 is in operative connection with locking part 20 by means of a coupling 21. The coupling is realized in the form of a ball, which is situated between locking part 20 and armature part 7 and projects into a respective recess, i.e., into a recess on locking part 20 and into a recess on armature part 7.

Locking part 20 in conjunction with locking part 9 forms a wedge gear. Locking part 9 has a sloping surface, so that when armature part 7 displaces locking part 20 in the direction of locking part 9, this locking part 9 is shifted transversely to the displacement direction of locking part 20. Bearing rollers, which roll along the sloping surface, are braced on locking part 20 in order to reduce friction. One of the two bearing rollers rolls along the sloping surface developed on locking part 9, so that it is pushed away transversely to the displacement direction of locking part 20. A further bearing roller 19 is similarly disposed on locking part 20, so that another locking part 18 is shifted in the opposite direction of locking part 9 when locking part 20 is displaced in the downward direction, i.e., in the direction of its longitudinal axis.

Locking part 18 is braced on support element 16 via bearing rollers 17, and locking part 9 is supported on locking part 18 via bearing rollers 15.

A brake pad support 11, which is provided with a brake pad 10 on its outer circumference, is situated in the end region of locking part 9 facing away from locking part 20.

When locking part 9 is pushed away by displaced locking part 20, brake pad 10 overcomes air gap 12 and is pressed against brake drum 14, so that braking takes place.

Brake drum 14 is developed as an annular part and carries roller lining 13 on its outer periphery, which is made of plastic, rubber or some other vulcanized material, in particular. The roller rolls along the driving surface via roller lining 13.

When locking part 18 is pushed away by shifted locking part 20, the further brake pad support, connected to locking part 18, and its brake pad 10 disposed thereon overcome a corresponding air gap and are pressed against brake drum 14 as well, so that braking is occurring.

In other words, when locking part 20 is displaced in the downward direction, the two locking parts 9 and 18 are pushed away from each other by the wedge gear. This takes place counter to the spring force generated by a spring element, which presses the two brake pad supports 11 against each other.

When locking part 20 slides out, i.e., when it is displaced in the upward direction, the brake pad supports are therefore brought closer to each other.

Brake pad carriers 11 are rotationally mounted at a circumferential position with the aid of a pivot bearing 50.

The spring element is situated on the opposite side of pivot bearing 50 in the circumferential direction in order to press brake pad carriers 11 towards each other. Brake pad supports 11 are connected to a locking part 9 or 18 in this circumferential angular range, so that the displacement of locking parts 9 and 18 must take place counter to the spring force generated by the spring element.

Sleeve 2, made of aluminum or plastic, in particular, forms a radially inwardly directed delimitation of coil 31, and thus functions at least partially as a coil brace, but does not conduct a magnetic field.

Coil core 3 projects into sleeve 2, so that air gap 1 between coil core 3 and coil core housing part 4 is delimited by sleeve 2 and coil core 3 as well as by coil core housing part 4. Coil core housing part 4 conducts the magnetic field lines arriving from coil core 3 back at the outer circumference and via an air gap, into armature part 7, which guides the magnetic lines into the interior space surrounded by the coil, so that only working air gap 1 between coil core 3 and armature part 7 still needs to be overcome by the magnetic field lines.

Spring element 5 held in place on coil core housing part 4 exerts downward pressure on armature part 7, i.e., in the direction of the axis of symmetry of sleeve 2.

Brake drum 14 is connected to a shaft 27, which is braced on a support element via a bearing. This support element is disposed in a manner that allows it to pivot, the pivot axis corresponding to the longitudinal axis of locking part 20. This makes it possible for the roller to rotate in the driving direction and realizes the bracing of the roller with overrunning. The pivot axis, i.e., the axis of rotation, of the pivoting motion simultaneously is also the transmission of the force that is operating the drum brake, which is induced by the magnetic force of the lift magnet and the counteracting spring force of spring element 5.

The wedge gear makes it possible to deflect the actuating force routed through the pivot axis into the drum brake, which is situated outside the pivot axis because of the after-running of the rollers, i.e., pivot rollers.

The ball acting as coupling 21 corrects alignment errors, especially angular deviations between armature part 7 and locking part 20.

Inner ring 30 is made up of multiple parts in order to simplify the installation of the pivot bearing.

LIST OF REFERENCE NUMERALS

1 air gap
2 sleeve, in particular made from aluminum or a plastic material
3 coil core
4 coil core housing part
5 spring element
6 housing part
7 armature part
8 disk with bore pattern of bore holes 22
9 locking part of the wedge gear
10 brake pad
11 brake pad support
12 Working gap of the brake
13 roller lining
14 brake drum
15 bearing roller
16 supporting structure
17 bearing roller
18 locking part of the wedge gear
19 bearing roller
20 locking part of the wedge gear
21 coupling, in particular ball
22 bore
23 locking latch
24 spring element
25 coil of the locking unit
26 coil core
27 shaft
28 outer ring part of the pivot bearing
29 sliding bearing element, especially made of plastic or a soft material such as aluminum or bronze
30 inner ring of the pivot bearing
31 coil of the brake
32 support plate
50 pivot bearing

The invention claimed is:

1. A mobile component, comprising:
a roller bearing unit;
a pivot unit;
a frame;
at least one pivot bearing;
a roller rotationally braced in the pivot unit, the pivot unit being supported via the pivot bearing on the frame of the mobile component;
a drum brake arranged on the roller;
an electromagnet connected on the frame and for actuating the drum brake; and
a wedge gear via which the drum brake is actuated by the electromagnet, wherein the wedge gear includes a plurality of locking parts,
wherein, upon energizing the electromagnet, displacement of one of the locking parts in a first direction causes a displacement of another one of the locking parts in a second direction transverse to the first direction, wherein the transverse displacement of the other one of the locking parts actuates the drum brake.

2. The mobile component as recited in claim 1, wherein the roller bearing unit includes steering roller.

3. The mobile component as recited in claim 1, wherein the roller includes a drive roller.

4. The mobile component as recited in claim 1, wherein the at least one pivot bearing includes a plurality of pivot bearings, wherein axes of rotation of the pivot bearings are orthogonally aligned with respect to each other, wherein an axis of rotation of the pivot bearing for pivoting parallel to a direction of a normal of a driving surface of the mobile component being touched by the roller.

5. The mobile component as recited in claim 1, further comprising:
a coupling which includes a ball and is situated between the electromagnet and the wedge gear.

6. The mobile component as recited in claim 1, wherein:
the electromagnet includes an armature part that is mounted so as to allow displacement and which can be pressed against the one of the locking parts by a spring element when a coil of the electromagnet is not energized, so that the other one of the locking parts is shifted in a direction that has a non-vanishing angle with respect to the displacement direction of the armature part that corresponds to a perpendicular angle with respect to the displacement direction of the armature part.

7. The mobile component as recited in claim 6, wherein the coil is situated in a coil core housing part that is connected to a coil core that is at least partially surrounded by the coil,
a working air gap being disposed between the armature part and the coil core, which is situated in the region covered by the coil in a longitudinal direction.

8. The mobile component as recited in claim 1, wherein the one of the locking parts has a sloping surface, wherein a roller which is able to roll on the sloping surface is braced on the other one of the locking parts, a direction of a surface normal of the sloping surface having a non-vanishing angle with respect to a displacement direction of an armature part of the electromagnet.

9. The mobile component as recited in claim 8, further comprising:
a ball interposed as coupling between the armature part and the one of the locking parts, the ball one of projecting into and being disposed in a depression of the armature part and a depression of the one of the locking parts.

10. The mobile component as recited in claim 8, wherein the wedge gear has an inputting locking part that is able to be driven by the armature part, and two outputting locking parts, each of which has a sloping surface, each outputting locking part being connected to a brake pad support, which is able to be pressed against a brake drum of the roller by the locking part.

11. The mobile component as recited in claim 8, wherein the armature part and the one of the locking parts are spaced apart from each other in a longitudinal direction of the coil of the electromagnet, the ball of the coupling being interposed.

12. The mobile component as recited in claim 1, further comprising:
two brake pad supports interconnected with the aid of the at least one pivot bearing, the brake pad supports being moved toward each other in a circumferential direction with the aid of a spring element, the pivot bearing being set apart from the spring element in the circumferential direction at a maximum distance.

13. The mobile component as recited in claim 1, wherein the roller has a roller lining that radially surrounds the drum brake, the roller lining being produced from vulcanized material including rubber.

14. The mobile component as recited in claim 1, wherein a conductance of a force operating the drum brake runs radially within the pivot bearing.

15. The mobile component as recited in claim 1, wherein:
the pivot bearing is realized by an inner ring which is glidingly supported in an outer ring, ring axes of the inner and outer rings being identical,
one of an inner ring is form-fittingly disposed inside the outer ring in the axial direction, and an outer ring is form-fittingly disposed inside the inner ring,
one of the inner ring is arranged in a groove of the outer ring, and the outer ring is arranged in a groove of the inner ring,
the part having the groove, corresponding to one of the inner ring and the outer ring, includes multiple parts,
the outer ring is fixedly provided on the frame, and
the inner ring is fixedly provided on the pivoting part.

16. A mobile component, comprising:
a roller bearing unit;
a pivot unit;
a frame;
at least one pivot bearing;
a roller rotationally braced in the pivot unit, the pivot unit being supported via the pivot bearing on the frame of the mobile component;
a drum brake arranged on the roller;
an electromagnet connected on the frame and for actuating the drum brake; and
a wedge gear via which the drum brake is actuated by the electromagnet, wherein the wedge gear includes a plurality of locking parts,
wherein:
upon energizing the electromagnet, one of the locking parts causes a displacement of another one of the locking parts, wherein the displacement of the other one of the locking parts actuates the drum brake,
the pivot unit is able to be locked on the frame in a reversible manner with the aid of a latching unit,
the latching unit includes a further electromagnet having a linearly displaceable armature part that is able to be driven into a depression corresponding to a bore hole, for locking purposes, and
when the further electromagnet is energized, the linearly displaceable armature part is able to be pushed out, counter to a force of a spring element, for unlocking purposes.

17. A mobile component, comprising:
a roller bearing unit;
a pivot unit;
a frame;
at least one pivot bearing;
a roller rotationally braced in the pivot unit, the pivot unit being supported via the pivot bearing on the frame of the mobile component;
a drum brake arranged on the roller;
an electromagnet connected on the frame and for actuating the drum brake; and
a wedge gear via which the drum brake is actuated by the electromagnet, wherein the wedge gear includes a plurality of locking parts,
wherein, upon energizing the electromagnet, one of the locking parts causes a transverse displacement of another one of the locking parts, wherein the transverse displacement of the other one of the locking parts actuates the drum brake; and wherein, upon energizing the electromagnet, the one of the locking parts is displaced in a first direction, and the displacement of the one of the locking parts in the first direction causes the transverse displacement of the other one of the locking parts in a second direction transverse to the first direction.

18. A mobile component, comprising:

a roller bearing unit;

a pivot unit;

a frame;

at least one pivot bearing;

a roller rotationally braced in the pivot unit, the pivot unit being supported via the pivot bearing on the frame of the mobile component;

a drum brake arranged on the roller;

an electromagnet connected on the frame and for actuating the drum brake; and a wedge gear via which the drum brake is actuated by the electromagnet, wherein the wedge gear includes a plurality of locking parts, wherein, upon energizing the electromagnet, one of the locking parts causes a transverse displacement of another one of the locking parts, wherein the transverse displacement of the other one of the locking parts actuates the drum brake; and wherein at least one of the locking parts of the wedge gear includes a sloped surface adapted to engage with another one of the locking parts to cause the transverse displacement of the another one of the locking parts to actuate the drum brake.

\* \* \* \* \*